United States Patent [19]

Matsumoto

[11] Patent Number: 4,469,522
[45] Date of Patent: Sep. 4, 1984

[54] PROCESS FOR TREATING FILLERS WITH FLUOROSILICONE COMPOUNDS

[75] Inventor: Makoto Matsumoto, Clifton Park, N.Y.

[73] Assignee: General Electric Company, Waterford, N.Y.

[21] Appl. No.: 368,931

[22] Filed: Apr. 16, 1982

Related U.S. Application Data

[63] Continuation of Ser. No. 195,579, Oct. 8, 1980, abandoned.

[51] Int. Cl.$^3$ .................... C04B 31/40; C09C 3/00
[52] U.S. Cl. .................... 106/308 M; 106/308 N; 106/288 B; 427/220; 427/221; 523/209; 523/213
[58] Field of Search ............. 106/308 N, 308 M; 523/209, 213

[56] References Cited

U.S. PATENT DOCUMENTS

| | | | |
|---|---|---|---|
| 2,890,188 | 6/1959 | Konkle et al. | 524/492 |
| 2,938,009 | 5/1960 | Lucas | 523/212 |
| 2,954,357 | 9/1960 | Fekote | 524/264 |
| 2,961,425 | 11/1960 | Pierce et al. | 556/406 |
| 2,979,519 | 4/1961 | Pierce et al. | 556/406 |
| 3,002,951 | 10/1961 | Johannson | 528/14 |
| 3,006,878 | 10/1961 | Talcott | 524/500 |
| 3,024,126 | 3/1962 | Brown | 106/308 N |
| 3,179,619 | 4/1965 | Brown | 524/860 |
| 3,243,404 | 3/1966 | Martellock | 524/188 |
| 3,377,284 | 4/1968 | Schiefer et al. | 252/49.6 |
| 3,386,945 | 6/1968 | Bartell et al. | 524/783 |
| 3,464,945 | 9/1969 | Martellock | 524/724 |
| 3,630,982 | 12/1971 | Matherly | 523/220 |
| 3,635,743 | 1/1972 | Smith | 106/288 Q |
| 3,639,239 | 2/1972 | Groenhof | 252/49.9 |
| 3,694,479 | 9/1972 | Groenhof | 252/49.9 |
| 3,813,364 | 5/1974 | DeZuba et al. | 524/588 |
| 3,837,878 | 9/1974 | Beers | 106/308 Q |
| 3,888,815 | 6/1975 | Bessmer et al. | 524/703 |
| 4,029,629 | 6/1977 | Jeram | 523/203 |
| 4,041,010 | 8/1977 | Jeram | 524/407 |
| 4,061,609 | 12/1977 | Bobear | 524/703 |
| 4,089,833 | 5/1978 | Simpson | 524/264 |
| 4,100,129 | 7/1978 | Beers | 524/425 |
| 4,101,499 | 7/1978 | Herzig | 524/731 |
| 4,116,919 | 9/1978 | Elias et al. | 523/213 |
| 4,124,560 | 11/1978 | Herzig | 524/847 |

Primary Examiner—Wilbert J. Briggs, Sr.

[57] ABSTRACT

A process for treating fillers with a fluorosilicone compound comprising contacting a filler more preferably a silica filler with a fluorosilicone nitrogen compound. Such a treated filler is preferably incorporated in fluorosilicone room temperature vulcanizable silicone rubber compositions and heat vulcanizable silicone rubber compositions.

7 Claims, No Drawings

PROCESS FOR TREATING FILLERS WITH FLUOROSILICONE COMPOUNDS

This application is a continuation of application Ser. No. 195,579, filed Oct. 8, 1980, now abandoned.

BACKGROUND OF THE INVENTION

The present invention relates to treating fillers and more particularly the present invention relates to treating fillers with a fluorosilicone nitrogen compound.

It is well known that silicone elastomers are formed from heat curable silicone rubber compositions and room temperature vulcanizable silicone rubber compositions. Generally such heat curable silicone rubber compositions generally comprise, other than a diorgranopolysiloxane polymer having a viscosity of anywhere from 500,000 to 300,000,000 at 25° C., a silica filler and a peroxide curing catalyst. There is preferably incorporated in such heat curable silicone rubber composition some type of process aid which allows the composition to be milled or mixed, that is the filler to be mixed into the polymer more easily and prevents the composition upon standing from structuring. Structuring is the condition where the uncured mixed polymer and filler set up so that the composition is very difficult to plasticize prior to cure. As noted, such compositions with the presence of peroxide curing catalyst will cure at elevated temperatures, that is temperatures above 100° C. to silicone elastomers.

An example of such composition is for instance disclosed in DeZuba et al U.S. Pat. No. 3,813,364 which is hereby incorporated by reference. Such heat curable silicone rubber compositions are also known where the base polymer has fluoroalkyl substituent groups and more specifically trifluoropropyl substituent groups. Such heat curable fluorosilicone polymers have the advantage of producing solvent resistant silicone elastomers. An example of such a composition is for instance in the patent of Brown U.S. Pat. No. 3,179,619.

Room temperature vulcanizable silicone rubber compositions are also well known. One such type of room temperature vulcanizable composition, hereinafter referred as an RTV composition, comprises a vinyl terminated diorganopolysiloxane polymer, a filler, a hydride polysiloxane cross-linking agent and a platinum catalyst. The composition which can also have a strong inhibitor so that it can be packaged as one component or in the case of less active inhibitors as a two component composition. However, in the absence of an inhibitor it will rapidly cure a room temperature to a silicone elastomer or will rapidly cure to a silicone elastomer at elevated temperatures. An example of elevated temperatures is meant temperatures above 100° centigrade. An example of such an SiH olefin platinum catalyzed RTV composition is for instance disclosed in Bobear U.S. Pat. No. 4,061,609.

Such SiH olefin platinum catalyzed compositions are also known in which the base polymers or the hydride polysiloxane cross-linking agent has fluoroalkyl substituent groups and more specifically trifluoropropyl substituent groups. An example of such compositions is for instance to be found in the U.S. patents of Jerum, U.S. Pat. No. 4,041,010 and U.S. Pat. No. 4,029,629.

There is also another type of RTV composition which generally comprises a silanol terminated linear diorganopolysiloxane polymer as the base polymer, a filler which is preferably a silica filler at least in part, an acyloxy functional silane as the cross-linking agent and a metal salt of a carboxylic acid as a catalyst. Such a composition is packaged in a single component and when exposed to atmospheric moisture the cross-linking agent hydrolyzes so to cross-link the composition to form a silicone elastomer.

Another type of RTV composition that is of the silanol condensation type is one where in addition to a alkoxy functional cross-linking agent there is a metal salt of carboxylic acid as a catalyst which composition is packaged in two packages, which composition when the two packages are mixed together will cure to a silicone elastomer. Another type of the condensation curing one part or one component RTV composition comprises a base silanol end-stopped diorganopolysiloxane polymer of a viscosity in the range of anywhere from 1,000 to 500,000 at 25° C. and this viscosity range is also true for the other RTV compositions, both in the condensation and of the SiH olefin platinum catalyst type. There is incorporated in addition to silanol polymer, filler which is preferably in part silica and an alkoxy functional cross-linking agent and the titanium compound as the catalyst. Such a composition is packaged in an anhydrous state or one component state which is stable but when exposed to atmospheric moisture will cross-link to form a silicon elastomer. Such RTV compositions are also known where the base polymer has a fluoroalkyl substituent group such as trifluoropropyl substituent group.

In all such compositions whether they be the RTV type or the heat curable type, it is generally well known in the art to treat such fillers with a treating agent. In the case of the heat curable composition it is known to use a process aid to allow the filler to better mixed with the polymer and also to prevent it from structuring after it has been mixed and also for maintaining the viscosity of the composition as low as possible during the mixing of the filler into the polymer. The tendancy of the filler to increase the viscosity of the mixed composition during mixing is especially noticable with silica fillers such as fumed silica and precipitated silica. Examples of the process aid that have been disclosed for treated fillers of heat curable silicone rubber compositions is for instance disclosed in the following patents: Fekete U.S. Pat. No. 2,954,357, Konkele U.S. Pat. No. 2,890,188 and Martellock U.S. Pat. No. 3,464,945. U.S. Pat. No. 3,464,945 is pertinent in that it disclosed the use of a particular type of possibly an amine functional compound as a process aid for treating the filler in a heat curable silicone rubber composition.

However, even more pertinent, is Martellock U.S. Pat. No. 3,234,404 which is incorpoated by reference and which discloses the use of a silazane for treating fillers in heat curable silicone rubber compositions. It should be noted there is nowhere disclosed in that patent the presence of fluoroalkyl substituted silazanes or silicone nitrogen compounds. It should be noted that silizane are also well known for treating silica fillers in RTV compositions, both one component and two component. More particularly one compositions. Such disclosure for treating fillers with silazanes in one component compositions is for instance to be found in the foregoing patents on RTV compositions mentioned above and also further in Smith, U.S. Pat. No. 3,635,743, Beers U.S. Pat. No. 3,837,878. It was found that the use of such fillers was advantageous over fillers treated with just cyclo-polysiloxanes as disclosed in Lucas, U.S. Pat. No. 2,938,009 and other patents.

Fillers while adding advantageous properties to RTV compositions such as increasing tensile strength and tear nevertheless have the undesirable property of increasing the uncured viscosity of the composition thus making it difficult to pour prior to cure. These effects of fillers are especially noticable in silica fillers and more specifically with precipitated silica and fumed silica. Accordingly, as disclosed in the foregoing patent it was found desirable to treat such silica fillers that were utilized in RTV compositions with a cyclic polysiloxane so as to incrase the physical properties of the final cured composition while keeping the increase in viscosity of the uncured composition to as low as a level as possible. It was found that the desirable effects of cyclic polysiloxane would be further increased by treating the filler with siloxanes, either alone or in conjunction with cyclic polysiloxanes and other treating agents as for instance disclosed in the foregoing Beers patents. Such treating processes with silazanes will retard the increase in viscosity or maintain the increase in viscosity of the uncured composition due to the addition of fillers and specifically of silica fillers to as low a point as possible but at the same time result in the cured composition with enhanced physical properties such a tensile strength, elongation, tear and durometer. Accordingly, it was found by the utilization of such treating agents it was possible to add more filler into the composition that was hereto possible with same increase in viscosity as with prior art compositions. Such procesures of treating fillers was adopted with the fluorosilicone RTV heat curable composition. Accordingly, it was utilized in Simpson U.S. Pat. No. 4,089,833 to treat heat curable fluorosilicone compositions with a process aid which was fluorine-substituted.

However, as far as it is known it has not been heretofore disclosed to treat fillers or either RTV compositions or heat curable compositions with fluoroalkyl substituted silazane compound. It has been found in the case of the treating of fillers and specifically of silica fillers with fluoroalkyl substituted silazane compounds (hereafter, we call these compounds as "fluorosilazane") that the viscosity in some case is dramatically lowered of the uncured composition and in other case the elongation, tensile, tear is improved. Fluorosilazane compounds are disclosed in U.S. Pat. No. 3,694,479 and U.S. Pat. No. 3,639,239; however, such compounds are not disclosed for treating fillers. These and other advantages will be disclosed below.

In accordance with the above disclosure it is one object of the present invention to provide for a process for treating fillers, both the heat curable compositions and RTV compositions with a fluoro-containing silazane compound or compounds.

It is another object of the present invention to provide a process for treating silica fillers with fluoro-containing silazane compounds.

It is still another object of the present invention to incorporate into a RTV composition or a heat curable composition or filler treated with a fluoro-containing silazane compound so as to result in cured compositions with improved properties.

It is an further object of the present invention to provide a process for forming cured RTV compositions and heat curable silicone rubber compositions with improved properties by treating the filler in such compositions with fluoro-containing silazane compounds.

These and other objects of the present invention are accomplished by means of the disclosure set forth herein below.

SUMMARY OF THE INVENTION

In accordance with the above object there is provide a process for treating fillers with a fluorosilicone compound comprising contacting the filler having a specific surface area in the range from 20 to 800 meters per gram with a fluorosilicone nitrogen compound selected from the class consisting of:

(a) a silyl amine of the formula,

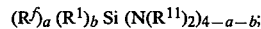

(b) fluorosilicon-nitrogen compound of the formula,

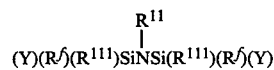

where Y is selected from $R^{111}$ and $(R^{11})_2 N-$; and (c) a silicon-nitrogen polymer comprising (1) from 3 to 100 mole percent chemically combined structural units selected from the class consisting of units having the formula,

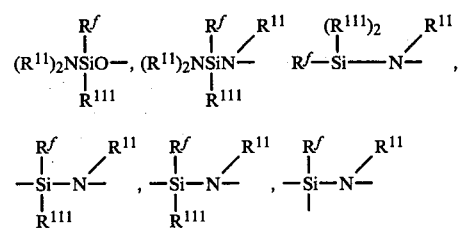

and (2) from 0 to 97 mole percent chemically combined structural units represented by the formula,

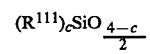

where the silicon atoms of silicone-nitrogen polymer are jointed to each other by a member selected from an SiO Si linkage and a SiN $R^{11}$ Si linkage, the free valences of said silicone atoms other than to oxygen to form a siloxy unit and nitrogen to form a siloxy unit are joined to a member selected from an $R^{11}$ radical and $(R^{11})$ N radical, and where the ratio of the sum of $R^{11}$ radicals and $R^{11})_2 N$ radicals to the silicone atoms of said silicone nitrogen polymer has a value of from 1.1 to 3, inclusive, where $R^f$ is a fluoroalkyl radical, $R^1$ is a radical selected from the class consisting of hydrogen, a monovalent hydrocarbon radical, and alkoxy radicals having from 1 to 8 carbon atoms, $R^{11}$ is a radical selected from the class consisting of hydrogen and monovalent hydrocarbon radicals, $R^{111}$ is a radical selected from the class consisting of hydrogen, fluoroalkyl, radicals and monovalent hydrocarbon radicals a is a integer equal to 1 or 2, inclusive, b is an integer equal to 1 or 2 inclusive where the sum of a+b does not exceed 3 and c is whole number equal to 0 to 3, inclusive.

Preferably there is also incorporated in such process for treating a filler, a small amount of water and the treatment is carried out at elevated temperatures preferably in the area of 100° to 170° C. Such fillers are preferably incorporated into heat curable compositions, SiH platinum catalyzed compositions and RTV compositions of the condensation type. There is also provided by the present invention a process for preparing the foregoing RTV and heat curable silicone rubber compositions having therein the silica filler treated with a fluorosilicone nitrogen compound.

DESCRIPTION OF THE PREFERRED EMBODIMENT

In the above formulas $R^f$ is a fluoroalkyl radical of 3 to 8 carbon atoms which preferably is a trifluoropropyl radical that is 3,3,3-trifluoropropyl.

$R^1$ is a radical selected from the class consisting of hydrogen and monovalent hydrocarbon radicals and alkoxy radicals of 1 to 8 carbon atoms. An example of monovalent hydrocarbon radicals which $R^1$ can be are for instance alkyl radical such as methyl, ethyl propyl; alkenyl radicals, such vinyl allyl, cyclo alkyl radicals such as cyclohexyl, cycloheptyl, mononuclear aryl radicals such as phenyl, methylphenyl, benzyl etc; and other radicals commonly associated as organic substituent groups with silicone atoms, silicone monomers and silicone polymers. Preferably the $R^1$ radical is selected from alkyl radicals of 1 to 8 carbon atoms or hydrogen. $R^{11}$ is a radical selected from the class consisting of hydrogen and monovalent hydrocarbon radicals which $R^{11}$ can be are any of the monovalent hydrocarbon radicals identified above for $R^1$. Finally $R^{111}$ is a radical selected from the class consisting of hydrogen, fluoroalkyl radicals and monovalent hydrocarbon radicals. Preferably the fluoroalkyl radicals are from 3 to 8 carbon atoms and the monovalent hydrocarbon radicals are from 1 to 8 carbon atoms. More preferably the $R^{111}$ is 3,3,3-trifluoropropyl or a monovalent hydrocarbon radical of from 1 to 8 carbon atoms. Examples of monovalent hydrocarbon radicals which the $R^{111}$ radicals can be is alkyl radicals of 1 to 8 carbon atoms such a methyl ethyl etc.; alkenyl radicals such as vinyl allyl etc; cycloalkyl radicals such as cyclohexyl, cycloheptyl etc.; mononuclear aryl radicals such as phenyl, methylphenyl, ethylphenyl, benzyll etc. Preferably $R^{111}$ is a mixture of 3,3,3-triflouropropyl and an alkyl radical of 1 to 8 carbon atoms. Most preferably $R^{111}$ is selected from the class consisting of hydrogen, 3,3,3-trifluoropropyl and alkyls radicals of 1 to 8 carbon atoms.

The silicon-nitrogen materials that can be employed in the practice of the present invention include silicon-nitrogen polymer in the form of silazanes and silazane-siloxane copolymers having at least 3 mole percent of chemically combined silazy units and up to 97 mole percent of combined siloxy units. The silazane polymers can include, for example, cyclics consisting of chemically combined

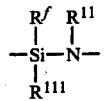

units, linear polymers having at least one unit selected from

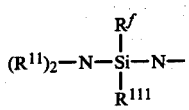

and

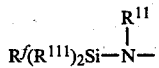

and consisting of essentially of

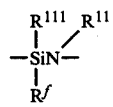

units and polymers having at least one unit selected from

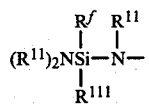

and

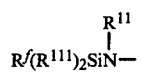

and a sufficient amounts of units selected from

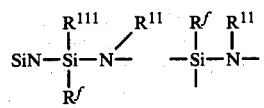

and to provide for a ratio of 1.5 of 3 to the sum of the $R^f R^{111}$ and $(R^{11})_2N$ radicals per silicon atom in said silazane polymer.

The silizane-siloxane copolymers can also be in the form of cyclics, and consist of chemically combined $(R^{111})_2SiO$ units and

units. Linear silazane-siloxane copolymers are also included where the moles percent of

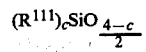

units can be as high as 97 moles percent, while the balance can be a unit selected from

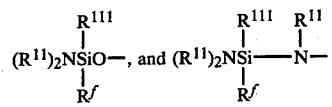

to provide for a ratio of the sum of $R^{111}+(R^{11})_2N+R^f$ radicals per silicon atom of said silazane-siloxane copolymer of from 1.5 to 3.

The silicone nitrogen materials that can be employed as process aids in the practice of the present invention can be volatile liqids, or gummy, resinous, or crystalline solids, depending upon such factors as the molecular weight and the nature and average functionality of their respective chemically combined units.

Among the preferred silicon-nitrogen materials that are included by the silazanes as defined above are linear and cyclic silazanes having the formula:

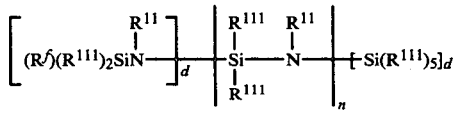

where n is zero or a positive whole number, and is preferably 0 to 20, inclusive, and d is a whole number equal to 0 to 1, inclusive, and where d is equal or 0, n is preferably equal to 3 to 7, inclusive, and R/, $R^{11}$ and $R^{111}$ are as defined above.

In addition to the above silazanes, also included among the preferred silicon-nitrogen materials of the present invention are polysiloxanes having terminal silazane units as shown by the following formula,

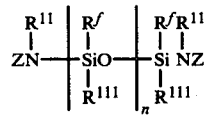

where $R^{11}$, $R^{111}$ and n are as defined above, and Z is $Si(R^{111})_3$. In preparing the silazane terminated compounds, ammonia is reacted at a temperature in the range of between about 0° C. to 100° C. with a halogenated polysiloxane having the formula,

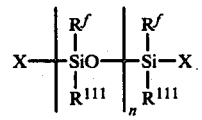

where $R^{111}$ and n are as defined above, and X is a halogen radical such as chloro or bromo. Since a terminal silazane radical is desired, a molar amount of $(R^{111})_3Si$ X can be reacted along with the halogenated polysiloxane, at least equivalent to the moles of halogen radicals contained therein. It will, of course, be appreciated that amines of the formula,

$H_2NR^{11}$ are utilized for forming the silazy chain-stopped polysiloxane of the invention where $R^{11}$ is as defined above.

The most preferable flourosilicone silazane compounds for utilization in the instant invention are ones of the formula,

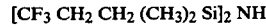

$[CF_3 CH_2 CH_2 (CH_3)_2 Si]_2 NH$ and also one of the formula,

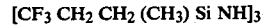

$[CF_3 CH_2 CH_2 (CH_3) Si NH]_3$

The above are the most preferred fluorosilicone nitrogen compounds to utilize in the present invention since they are simplest to make. These fluorosilicone silazane are reproduced by taking the corresponding chlorosilane specifically in one case the dimethyl hydrogen chlorosilane reacting it in the presence of a platinum catalyst with trifluoropropene to produce an intermediate and subjecting the chloronated intermediate in the process which will be describe below to produce the above corresponding fluorosilazane compound. The other preferred compound can also be produced by a simple method comprising taking the methyl hydride dichlorosilane and reacting it with trifluoropropene in the presence of platinum catalyst so as to add the propene group on to the silicone atom. When that reaction is terminated, the resulting compound is reacted with ammonia in access. The desired product above will be produced by preferentially distilling overhead the primer of formula. There can be isolated in this compound for utilizing as a silica treating agent. The spcific process for treating the foregoing chlorosilane whether they be monofunctional, difunctional in chlorine or trifunctional in chlorine to produce the corresponding fluorosilazanes by a simple but efficient process. The process comprises taking the corresponding diB-dichloropolysiloxane compounds after the fluoroalkyl group has been added on and reacted with excess or even an amine compound as was disclosed above or in 10 to 20 percent excess of ammonia in an amount necessary to react in chlorine groups is to produce the fluorosilazane. However, advantageously there is utilized 15 to 100 percent of excess so as to completely react the chlorine groups in the silicone compound to form the corresponding silazane. Preferably the reaction is carried at room temperature under elevated pressures extremely high pressures do not have to utilized pressure reaction of 20 to 50 p.s.i. is sufficient. It should be noted that carrying out the reaction pressures is desirable but necessary since the reaction can be carried out at atmospheric pressure. The utilization of pressure is especially desirable when amonia is to be reacted since amonia is normally a gas at room temperature and will react more efficiently if it is reacted with a chlorosilane or a diB-dichloropolysiloxane compound under pressure. Preferably the reaction is also carried out in the place of organic solvent although an organic solvent may be utilized or added to the reaction mixture after the reaction has been completed. A more efficient method of carrying the reaction is desirable to utilize an organic solvent of the water immiscible variety. Water misicible solvents such as alkenols and ketones are not suitable. What is desirable as water immiscible solvents in foregoing reaction is for instance an aliphatic hydrocarbon solvents such as cyclohexane, cycloheptane, aromatic solvents such xylene, toluene; chlorinated hydrocarbon solvents such as carbon tetrachloride, 1,1,2-trichloroethane. Sufficient solvent is utilized to dissolve all the chlorosilane when it is initially added to the reaction mixture. More solvent can be utilized but it is not necessary. In more preferred form of the reaction a solution of the chlorosilane compound is refluxed. Any solvent solution is refluxed at the temperature of the solvent to produce a more efficient reaction and a faster reaction than is possible without such reflux procedure. Accordingly, generally the reflux temperature of the solvents as disclosed above anywhere from a temperature of 90° C. to a temperature of 150° C. Preferably the reflux reaction is carried out for a period of at least two hours but more specifically the reaction can be carried out for a period of time anywhere from 2 to 8 hours At the time ammonia salts are produced in the reaction they are separated out by working the reaction mixture with equal volumes of water. The ammonia salts are dissolved in the water and decanted off. The solvent may be then stripped off to yield the desired florosilazane reaction product.

There is one caveat with respect to the reaction that is well known for chlorosilanes and that is the reaction must be carried out under anhydrous conditions. If water is present, it will preferentially hydrolyze the chlorosilane. Accordingly it is necessary to carry out the reaction in anhydrous conditions otherwise the water in the atmosphere will hydrolyze the chlorine groups in preference to the formation of silazane linkages. The silazane products will also hydrolyze to form siloxane linkages upon being exposed to atmospheric moisture but this is a much slower hydrolysis reaction than in the case with chlorosilanes. Accordingly, it is desirable that the silazane obtained by the above process be kept under an atmosphere of nitrogen or other substantially anhydrous states prior to use.

The above process is a simple an straight forward process for forming silyl amine, disilazane, silazane cyclic compounds and silazane polymers. The above preferred process is for forming fluoroalkyl substituted compounds. There is a slight modification of this process for silazane polymers and particularly silazane polymers of the formulas as shown above. Accordingly such a reaction comprises generally such a reaction process for forming fluorosilazane polymers much as is disclosed in U.S. Pat. No. 3,243,404 which is hereby incorporated by reference.

Such a process can for instance can be the taking of siloxane compounds to produce by reacting chlorosilane momomers with ammonia as disclosed above and then taking the silazane compounds and hydrolyze with insufficient water to completely hydrolyze all the silazane groups. Accordingly, by controlling the amount of water that is necessary to hydrolyze the silazane groups there can be reduced fluorosilazane polymers. Another process comprises hydrolyzing chlorosilanes with insufficient water to completely react all the chlorine groups so as to produce chlorinated polymers. By hydrolyzing for instance dimethyl dichlorosilanes with an insufficient amount of water to completely hydrolyze all the chlorine groups there is produced a chlorinated siloxane. After the chlorinated polymer is separated from the hydrolysis mixture by methods which are well known in the art for instance a combination of distillation and decanation procedures it can be reacted with ammonia to produce the silazane compound. It should be noted that all the cases that were mentioned above for the production of fluorosilazanes polymers that it is understood that the silane monomer that is hydrolyzed has at least one fluoroalkyl substituent group or that a portion of the monomers hydrolyzed contain at least one fluoroalkyl substituent group such as 3,3,3-trifluoropropyl.

Another process that may be utilized is taking the corresponding fluoroalkyl substituted cyclotetrasiloxane to form a polymer by methods well known to the art and adding sufficient diorganodichlorosilane such What the final polymer that is produced by the equilibration process contains chlorine groups in the desired proportions. The final polymer that was obtained is reacted with ammonia or an amine compound in the above process that was described above for the production for silazanes from fluorosilicone monomers to produce the desired silazanes. It should be noted that this last process is the most preferred process for producing fluorosilazane polymers.

It should be noted above the usual process for producing polysiloxane polymers is to hydrolyze diorganodichlorosilanes to produce a mixture of linear cyclic polysiloxanes and then heat the hydrolysis mixture in the presence of alkali metal hydroxide so as to preferentially distill overhead cyclotetrasiloxane. The cyclotetrasiloxanes are then taken with the appropriate substituent groups as desired mixed and equilibated at temperatures above 100° C. for a period of time of anywhere from 8 to 24 hours so as to produce a polymer. There is utilized in such equilibration mixtures a small amount of chainstopper that is a linear triorgano end-stopped siloxane terminated polymer so that a polymer of a desirable molecular weight is obtained. Generally when equilibration is reached there is obtained a linear polymer of high viscosity. In such equilibration there is utilized from 10 to about 500 parts per million of alkali metal hydroxide catalyst. When the equilibration reaction is over, the alkali metal hydroxide catalyst is neutralized with a silyl phosphate with the remaining cyclics stripped off to result in the pure polymer. By utilizing such a procedure they can obtained high viscosity diorganopolysiloxane polymers. By utilizing such a procedure with a mild catalyst there can be produced low molecular weight diorganopolysiloxane polymers which may have vinyl termination depending on the chainstopper that is utilized. By utilizing a less active catalyst then above and water as a chainstopper that there be produced silanol end-stopped diorganopolysiloxane polymers. Examples of such a process for the production of such polymers is for instance to be found recited in the foregoing patents, DeZuba U.S. Pat. No. 3,813,364, Peterson U.S. Pat. No. 4,250,290. The production of 3,3,3-trifluoropropyl substituted polysiloxanes is slightly different in that the tetramer is preferably not utilized but a trimer is, and such reaction is not an equilibration but a very quick reaction in which 99 percent of the trimer is converted to polymer. An example of such reactions can be found in following U.S. Pat. Nos. 2,979,519, 3,002,951, 2,961,425, 3,006,878, 3,179,619, 3,630,982, 3,386,945, 3,377,284.

The foregoing silazanes are preferably utilized to treat fillers of a surface area in the range of 20 to 800 meters per gram. Preferably such a filler having the above surface area is a silica filler. Most preferably the filler is a fumed silica or precipitated silica. It should be noted that the instant invention is not limited to the treated of solely silica fillers with the fluorosilazanes of the present case and some advantages are obtained by treating other types of fillers with fluorosilazanes of the instant case. Other types of fillers which are incorporated into silicone compositions which may treated with fluorosilazanes of the instant compounds are for instance titanium dioxide, methatone, zinc oxide, zirconimum silicate, silica aerogel, iron oxide, diatomaceous earth, calcium carbonate, glass fibers, magnesium oxide, chormic oxide, zirconium oxide, aluminum oxide, alpha quartz, calcined clay, carbon, graphite, cork, cotton and sythenic fibers. The foregoing fillers other than fumed silica, precipitated silica are considered extending fillers, and just a few of the extending fillers have been mentioned above. Other types of extending fillers may also be incorporated into silicone compositions and may be treated with some advantage by the fluorosilazanes of the instant case. Fumed silica is most desirable in heat curable and RTV compositions since that it enhances the physical properties to the highest degree.

Although the filler can be treated prior to the mixing of the filler with the polymer with the fluorosiloxane compound it is most advantageous to treat the filler while it is being mixed with the silicone polymer. Further, if the filler happens to be wet, no water has to be added to it that is if it contains up to 3 or more millimoles of OH per gram of silane, water does not have to be added to it. If the filler contains less than the above silanol then preferably there is utilized from 0.02 to 1 parts of weight of water per part of the silica filler. The water is added to the polymer as the filler is to be incorporated into the polymer. Preferably the mixing is carried out in the dough mixer but any type of mixing apparatus can be utilized such as a Banbury and other types of mixing apparatus. Preferably the mixing is carried out at elevated temperatures, that is temperatures in the range of 100° to 170° C. and more preferably in the range of 120° to 150° C. for a mixing time varying anywhere from at least 0.5 to up to 24 hours and more preferably the mixing time is anywhere from at least 0.5 to 16 hours. It should be noted that mixing can also be carried out at a room temperature however mixing at elevated temperatures results in a faster and more efficient mixing of filler to the diorganopolysiloxane polymer. The silazane is added at a concentration at anywhere from 0.1 to 100 parts by weight and more preferably 0.5 to 10 parts by weight per 100 parts of a base diorganopolysiloxane polymer and the concentration of filler and specifically silica filler is from 5 to 200 parts of silica filler per 100 parts by weight of the diorganopolysiloxane polymer.

It should be noted that if more filler is utilized than is disclosed in the above concentration rate, then of course, there would have to be utilized more silazane. All that is necessary to carry out the reaction is the utilization of the flourosiloxane compound by itself or with other treating agents such as other process aids or treating agents, the filler and the base diorganopolysiloxane polymer into which the filler is being mixed. It should be noted that the fluorosilazane compound is desirably mixed into the filler as uniformly as possible and is dispersed into the filler and diorganopolysiloxane polymer as uniformly as can be carried out and this is true also of the water which is added as needed.

With this method a filler is treated insitu as it is mixed into the diorganopolysiloxane polymer. Such a process is best for heat curable compositions, however, for RTV compositions it may be desirable to protect the filler with the fluorosilazane compound which can be carried out with heat suitable apparatus. The fluorosilazane may be utilized in conjunction with other compounds such cyclic polysiloxanes as disclosed in the foregoing Lucas patent.

The diorganpolysiloxane polymer may be any polymer which has a viscosity of at least 100 centipoise at 25° C. more preferably 1000 centipoise and up to at least 300,000,000 centipoise at 25° C. where the organo groups are monovalent hydrocarbon radicals. The monovalent hydrocarbon radicals are those given previously from the $R^1$ and $R^{11}$ groups include fluoroalkyl groups of 3 to 8 carbon atoms such as 3,3,3-trifluoropropyl. One type of diorganopolysiloxane polymer which is utilized for a heat curable composition comprises a polymer which has a viscosity of anywhere from 500,000 to 300,000,000 centipoise at 25° C. and has the formula

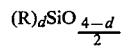

where R is selected from the class consisting of monovalent hydrocarbon radicals and fluoroalkyl radicals and small d varies from 1.95 to 2.01. The composition may have other additives such as carbon black, platinum and what have you for flame retardant purposes and other purposes. Such a composition is cured by incorporating into it from 0.1 to 8 parts by weight of peroxide and the composition is heated at temperatures above 100° C. to cure it to a silicone elastomer. Examples of such a composition for instance includes the foregoing Murtellock patents and the foregoing DuZuba et al U.S. Pat. No. 3,813,364. Another type of composition with a diorganopolysiloxane polymer is which the treated fillers of the present case may be utilized is SiH olefin platinum catalyzed compositions where the diorganopolysiloxane polymer has the formula,

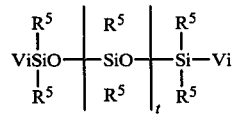

where Vi is vinyl and $R^5$ is selected from the class consisting of a monovalent hydrocarbon radicals and fluoroalkyl radicals and small t varies such that the viscosity of the polymer varies from 1,000 to 500,000 centipoise at 25° C. Such a composition is cross-linked with 0.5 to 50 parts by weight of a hydride containing polysiloxane having a hydrogen content varies from 0.4 to 1.6 percent by weight. Such a composition is catalyzed with a platinum compound which is preferably a platinum complex containing from 0.1 to 200 and preferably from 1 to 50 parts per million of the total composition of platinum. An example of such a composition and specifically a fluorosilicone composition of the SiH olefine platinum catalyzed composition type is found in U.S. Pat. No. 4,041,010 Jeram which is hereby incorporated by reference. There are many variations of such SiH olefin platinum catalyzed composition which are too numerous to mention. It is noted that the treated fillers, and more specifically the silica treated fillers can be utilized with advantages with such SiH olefin compositions and with fluoronated RTV compositions. It should be noted that such SiH olefin platinum catalyzed composition can be made one component and are normally two component. In the two component type the catalyst is packaged separately from the vinyl siloxane and the hydride cross-linking agent but there does not appear in ay single package a siloxane, a hydride cross-linking agent, and platinum, otherwise the composition would cross-link. When it is desired to cure the composition, the two packages are mixed and the composition is allowed to cure at room temperature in the absence of inhibitor or if there is an inhibitor present the composition is heated at elevated temperatures above 100° C. so that it cures rapidly in the matter of seconds. A modification of such composition is the utilization of strong hydroperoxy inhibitors as in Bobear U.S. Pat. No. 4,061,609 so that the composition can be one component which is stable at room temperature for a period of six months to two years and when it is heated at elevated temperatures cure rapidly to silicone elastomer.

Another type of RTV composition is the composition where the diorganpolysiloxane polymer has the formula,

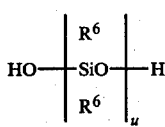

where $R^6$ is selected from the class of fluoroalkyl radicals and monovalent hydrocarbon radicals and u is an integer such that the polymer has a viscosity that varies from 100 to 500,000 centipoise at 25° C. Such a composition can be cured with a variety of cross-linking agents. One type of composition which is a two component type comprises having a second component an alkoxy functional silane which is catalyzed with a metal salt of a carboxylic acid with the metal varying from lead to manganese in the Periodic Table. When the second component that is a cross-linking agent and the catalyst is mixed with the base silanol polymer and the filler, the composition cross-links to form a silicone elastomer. An example of such a composition in the Lampe and Bessmer U.S. Pat. No. 3,888,815. Another type of RTV compositions which can be any of type of RTV composition in which the silanol base polymer and filler mixture can be utilized is a one component composition in which the cross-linking agent can be any of a variety of cross-linking agents such as amide functional, aceloxy functional, alkoxy functional, acetone functional 2-ethyl, hexonoxy functional, benzoxy functional and other types of functionality well known in the art. Accordingly, as an example with the above silanol polymer and the filler incorporated therein with the concentrations mentioned previously there may be incorporated with the fluorosilazane treating agent from 0.01 to 15 parts by weight of an acyloxy functional cross-linking agent and from 0.01 to 10 parts by weight of the metal salt of carboyxlic acid with a metal range varying from lead to manganese in the Periodic Table. Such a composition is stored in a single package and when exposed to atmospheric moisture cures to a silicone elastomer. An example of such a composition is for instance to be found in Kulpa U.S. Pat. No. 3,296,161. Another type of one component composition which can be utilized is one the base silanol polymer and the filler in which incorporated the fluorosilazane component mentioned previously and in which there is utilized from 0.01 to 15 parts by weight of an alkoxy functional cross-linking agent and from 0.01 to 10 parts by weight of a titanium compound. Such a composition is stored in a single package and upon exposure to atmospheric moisture cures to a silicone elastomer. An example of such a composition is for instance to be found in the disclosure of U.S. Pat. No. 4,100,129 which is hereby incorporated by reference. It should be noted that the above patents that have been given above as examples are not necessarily flouorsilicone patents. Such compositions that have fluorine substituent groups can be made by a worker skilled in the art, and the fluorosilazane treated fillers of the instant case can be utilized both with a fluoronated RTV and heat curable compositions and non-fluorinated heat curable and RTV compositions both of the condensation type and SiH olefin platinum catalyzed type.

The above patents were only given as representative of the art and were not given to limit the invention to any specific RTV or heat curable formulation. The examples given below are given for the purpose of illustrating the present invention and they are not given for the purpose of setting boundaries to the scope of the instant invention. All parts are by weight.

EXAMPLE 1

In a 2 liter flask, 150 parts by weight of dimethyltrifluoropropylchlorosilane and 500 cc's of hexanes were charged. Then, dry ammonia gas was fed into the mixture. The reaction was traced by gas chromotography. The reaction mixture was heated to a reflux temperature which was at about 70° C. After a period of time the reactant peak was very small. Stopped the ammonia gas feeding, then there was washed out the ammonia salt out of the hexanes with equal amounts of water. By distillation separation there was obtained 107 parts of a compound of the formula $$[CF_3CH_2CH_2(CH_3)_2Si]_2NH$$

which has a boiling point of 92° to 95° C. at 14 mmg. and represented a yield of 83.6 percent.

In a dough mixer there was mixed in one experiment 100 parts by weight of 50 mole percent of methyltrifluoropropyl, 50 mole percent of dimethyl of a vinyl dimethylsilyl chainstopped polysiloxane copolymer of 30,000 centipoise viscosity at 25° C. (Component A) Into this polymer there was mixed 25 parts of fumed silica, 3 parts of [(CH_3)_3Si]_2NH 1 part of water, 20 parts of 5 micron ground silica, 5 parts by weight of 50 mole percent of dimethyl, 50 mole percent of a methyl, 3,3,3-trifluoropropyl polysiloxane copolymer chain-stopped on one end of the polymer with a dimethylvinyl siloxy-group and chain-stopped at the other end of the polymer chain with a trimethyl siloxy group where the polymer has a viscosity of about 3,000 (component B). The resulting composition had a viscosity of 400,000 centipoise at 25° C. Then Lupersol 101, manufactured by the Lucidol Division, Pennwalt Corp., which is a peroxide which has the formula,

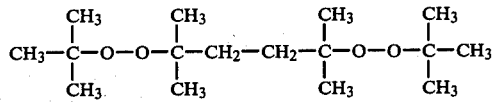

The heat cured composition has the following properties:

Durometer, Shore A — 33
Tensile psi — 509
Elongation % — 185
Tear pi — 32

A similar composition was prepared comprising 25 parts by weight of fumed silica, 3 parts by weight, [(CH_3)_3Si]_2NH. One part by weight of water, 100 parts by weight of 50 mole percent of methyltrifluoropropyl, 50 mole percent of dimethyl of a vinyl chain-stopped polysiloxane polymer with 60,000 to 70,000 centipoise viscosity at 25° C. This polymer is referred to as Component C. To this there was added 20 parts of participated silica. There was also present in the composition 5 parts by weight of Component B. The composition in the uncured mixed state had a viscosity of 840,000 centipoise at 25° C. The composition above was cured with 5 parts by weight of Lupersol 101 the same peroxide as above and the cured composition had the following physical properties.

Durometer Shore A — 36
Tensile psi — 49
Elongation % — 196
Tear pi — 34

EXAMPLE 2

There was utilized 100 parts by weight of Component A of Example 1 and 25 parts by weight of Aerosil 130. There was added 6 parts of the fluorosilazane compound of Example 1. To this there added 1 part by weight of water; 20 parts of 10 micron ground silica and 5 parts of component B of Example 1. The composition had the viscosity in the mixed uncured state of 360,000 centipoise at 25° C. The composition was cured with parts of lubersol 101 and the peroxide had the formula as given in Example 1. The cured composition had the following properties.

Durometer, Shore A — 30
Tensile psi — 614
Elongation % — 284
Tear pi — 77

Then the experiment was repeated with Component C of Example 1. Accordingly, there was mixed per 100 parts of Component C of Example 1, 25 parts by weight of Aerosil 130, 6 parts by weight of fluorosilazane of Example 1. One part by weight of water, 20 parts by weight of 5 micron ground silica and 5 parts by weight of Component B. The composition in the mixed state had a viscosity of 864,000 centipoise at 25° C. The composition when cured with 5 parts of the Lupersol 101, with the peroxide of Example 1 and had the following properties.

Durometer, Shore A — 28
Tensile psi — 706
Elongation % — 307
Tear pi — 69

EXAMPLE 3

In a dough mixer, 80 parts by weight of a 100 mole percent methyltrifluoropropyl dimethylvinyl chain-stopped polysiloxane polymer (Williams' plasticity: 230 after 1 min. at room temperature) and 20 parts by weight a 99.7 mole percent methyltrifluoropropyl 0.3 mole percent methyl vinyl, dimethylvinyl chainstopped polysiloxane polymer were charged.

Then, 4 parts of 86.5 mole percent dimethyl, 13.5 percent methylvinyl trimethyl chain-stopped polysiloxane polymer (viscosity at room temperature 1,000,000 cps) was mixed to the purpose of giving good processability to the compound.

Also 4 parts of $[CF_3CH_2CH_2CH_3)_2Si]_2NH$ and 25 parts of fumed silica were added.

The resulting compound was catalyzed with 1.5 parts of Varox master batch (67% Varox powder manufactured by Vanderbilt Company, 33 percent Dimethyl siloxane polymer).

The heat cured composition has the following properties:

shore A — 37
Tensile psi — 1189
Elongation % — 490
Tear pi — 208

Varox powder is 50 weight percent of $CaCo_3$ and 50 weight percent of the same peroxide as Lupersol 101 of Example 1.

The same composition was prepared using same ingredients except using $[(CH_3)_3Si]_2NH$ instead of $[CF_3CH_2CH_2(CH_3)_2Si]_2NH$ in the same concentrations. The heat cured composition had the following properties:

Shore A — 37
Tensile psi — 1138
Elongation — 420
Tear ppi — 162

EXAMPLE 4

In a doughmixer, 100 parts of component A of Example 1 (30,000 centipoise viscosity was charged.

Then, 3 parts of $[CF_3CH_2CH_2(CH_3)SiNH]_3$, 17 parts of fumed silica, 15 parts of $[CF_3CH_2CH_2(CH_3)SiO]_3$ treated fumed silica and 10 parts of 5 ground silica were mixed in order.

After that, 2 parts of water was added and hot mixed for 3 hours at 150° C. After cool down, the resulting composition was mixed with 1.3 parts of methylhydrogen polysiloxane wich is a resin cmpound composed of $H(CH_3)_2SiO_{0.5}$ units and $SiO_2$ units where the $CH_3+H$ to Si ratio was 2, and where the hydride concentration was 0.9 weight percent hydrogen, 0.3 parts of Luperson DDM (Methylethylketone hydroperoxide, Lucidol Division, Pennwalt Corp.) as a inhibitor and 15 parts per million of platinum in the form of a platinum complex with n-octanol. The final composition had a viscosity of 2,600,000 centipoise at 25° C. The heat cured composition has the following properties:

Shore A — 39
Tensile psi — 954
Elongation % — 510
Tear — 127

The sample composition was prepared using the same ingredients and the same concentration except using $[CH_3)_3Si]_2NH$ to compare with. Although the resulting composition had a viscosity of 2,800,000 centipoise at 25° C., the heat cured composition had the following properties:

Shore A — 42
Tensile — 840
Elongation — 420
Tear — 82

I claim:

1. A process for treating fillers with a fluorosilicone-nitrogen polymer comprising contacting a filler having a specific surface area of, approximately, 20 to 800 square meters per gram with a fluorine functional silicon-nitrogen polymer comprising:
   (1) from 3 to 100 mole percent of chemically combined units selected from the class consisting of:

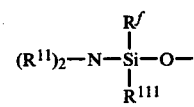

-continued

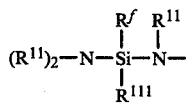

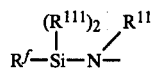

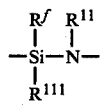

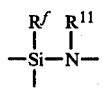

and
(2) from 0 to 97 mole percent of chemically combined structural units represented by the formula:

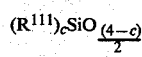

wherein the silicon atoms of said silicon-nitrogen polymer are joined by linkages selected from Si-O-Si linkages and Si-N($R^{11}$)-Si linkages, wherein the free valences of said silicon atoms other than those required to form siloxy and silazy units are joined to a member selected from an $R^{11}$ radical and an $(R^{11})_2N$ radical where the ratio of the sum of $R^{11}$ radicals and $(R^{11})_2N$ radicals to the silicon atoms of said silicon nitrogen polymer has a value of from 1.1 to 3, inclusive, where $R^f$ is a fluoroalkyl radical, $R^{11}$ is a radical selected from the class consisting of hydrogen and monovalent hydrocarbon radicals, $R^{111}$ is a radical selected from the class consisting of hydrogen, fluoroalkyl radicals and monovalent hydrocarbon radicals and c is a whole number equal to 0 to 3, inclusive.

2. A process as in claim 1 wherein the filler is selected from fumed silica and precipitated silica.

3. A process as in claim 1 wherein there is further present from 0.02 to 1 part by weight of water present per part of said silicon-nitrogen compound.

4. A process as in claim 3 wherein the contacting of the filler with the silicon-nitrogen compound takes place at a temperature in the range of 100° to 170° C.

5. A process as in claim 4 wherein the contacting is carried out for a period of at least 0.5 hours.

6. A process as in claim 5 wherein there is present from 0.1 to 100 parts of silicon-nitrogen compound per 5 to 200 parts filler.

7. A filler produced by the process of claim 5.

* * * * *